United States Patent [19]

Masek

[11] Patent Number: 5,272,749

[45] Date of Patent: Dec. 21, 1993

[54] TELEPHONE DIALING SYSTEM FOR CONVERTING SUBSCRIBER-CREATED TELEPHONE NUMBERS TO DIRECTORY NUMBERS

[76] Inventor: Jan K. Masek, 217½ S. Fuller Ave., Los Angeles, Calif. 90036

[21] Appl. No.: 681,361

[22] Filed: Apr. 8, 1991

[51] Int. Cl.$^5$ ............................................. H04M 3/42
[52] U.S. Cl. .................................. 379/216; 379/201; 379/211; 379/289; 379/355
[58] Field of Search ............... 379/201, 289, 211, 212, 379/213, 94, 97, 354, 355, 216

[56] References Cited

U.S. PATENT DOCUMENTS

| | | | |
|---|---|---|---|
| 4,633,041 | 12/1986 | Boivie et al. | 379/213 |
| 4,677,659 | 6/1987 | Dargan | 379/97 |
| 4,748,661 | 5/1988 | Edelstein et al. | 379/289 |
| 4,757,267 | 7/1988 | Riskin | 379/113 |
| 4,839,919 | 6/1989 | Borges et al. | 379/354 |

OTHER PUBLICATIONS

Radio Shack Catalog, 1988 (©1987), "Easy-to-Use Multifeature Phones" p. 83.
Copy of AAA membership card, 1991.

Primary Examiner—James L. Dwyer
Assistant Examiner—Ahmad F. Matar
Attorney, Agent, or Firm—Philip D. Junkins

[57] ABSTRACT

A special feature telephone dialing and switching application system for interconnection to and interaction with the switching system of a central telephone office for converting subscriber-created telephone numbers, including a recognition sequence of one or more digits having alternative alphabetical letter significance, to standard assigned telephone numbers including a 3 digit switch sequence number and a 4 digit recognition sequence number. The recognition sequence of digits of the subscriber-created telephone numbers are followed by the # symbol digit of key dialing telephones and are preceded by a special switch sequence number assigned to the special feature application system within the number phone area code serviced by the central telephone office.

14 Claims, 1 Drawing Sheet

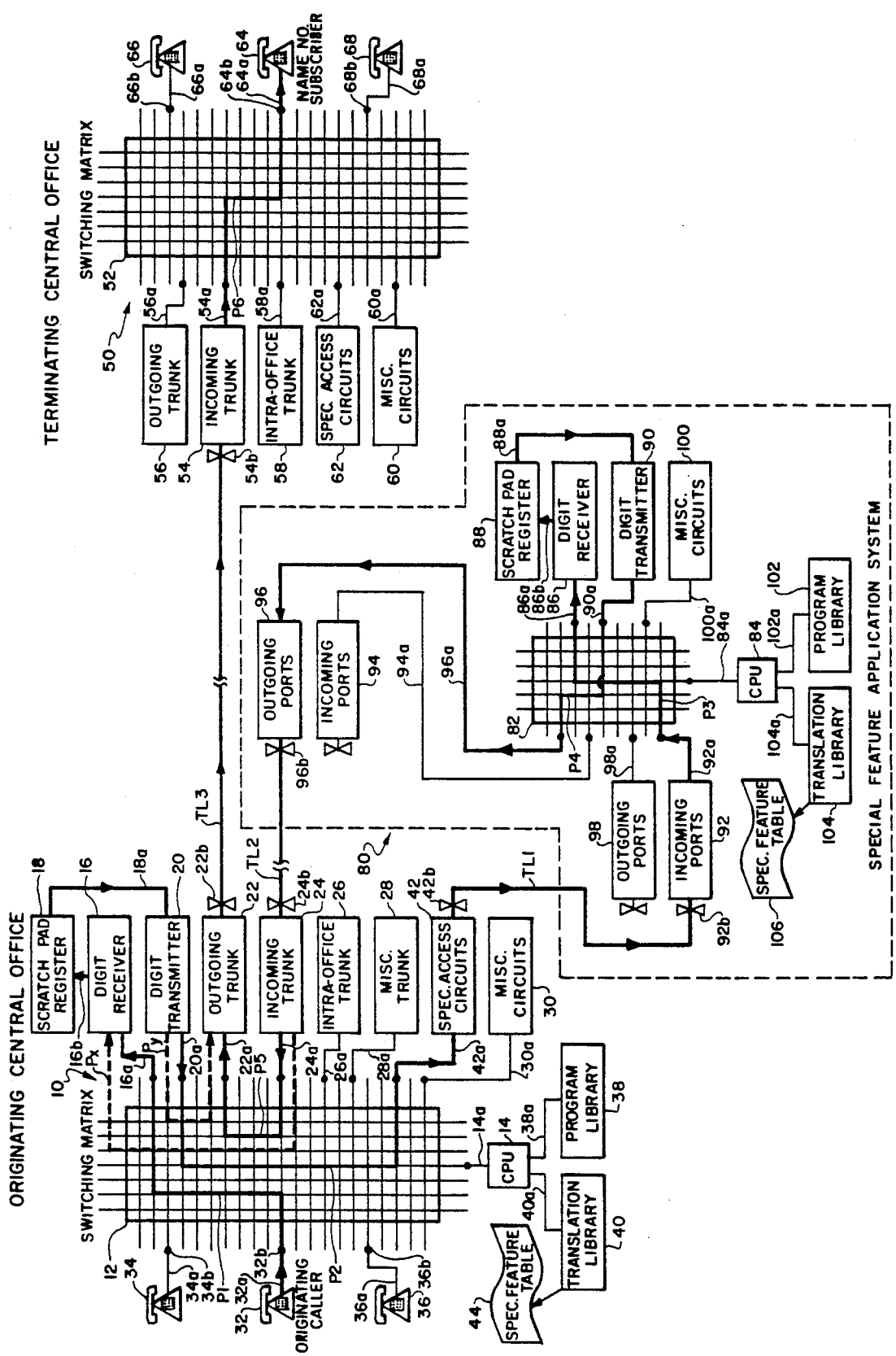

TELEPHONE DIALING SYSTEM FOR CONVERTING SUBSCRIBER-CREATED TELEPHONE NUMBERS TO DIRECTORY NUMBERS

BACKGROUND OF THE INVENTION

The present invention relates to the field of telephone dialing and switching systems. More particularly, the invention relates to telephone circuitry systems for converting one telephone number, expressed as a trade name or unique and distinctive combination of alphabet letters and numbers having personal or business significance, to another telephone number of little or no numerical significance.

A number of specific telephone services are typically requested by dialing a predetermined number or small grouping of numbers. Thus, for example, throughout the United States "0" is dialed to reach a local telephone operator, "411" is dialed to reach a local information operator, and "911" is dialed to reach a local police and fire emergency service operator. The digit receiver of each central office, servicing a vast group of telephone customers (subscribers), is programmed to recognize these specific numbers dialed by its customers and to route calls to such numbers through the correct circuits to the call terminating operator.

Telephone subscribers, particularly business subscribers, are constantly seeking to have telephone numbers assigned to them (individuals or businesses) which have some number, letter sequence or word significance so that calling parties (personal or business) will remember the assigned number or numbers without having to make reference to local phone directories. Domestic telephone numbers include the number plan area code number designation (3 digits), exchange number (3 digit switch sequence number) and subscriber assigned number (4 digit recognition sequence number from 0000 to 9999 which is unique to each exchange), dialed in sequence. Many subscribers hunt laboriously through exchange and assigned numbers (total of 7 digits) within their geographical area to find a telephone number providing a desired number, letter sequence or word of personal or business significance. For example, telephone numbers that end in three "0" digits are popular and hard to obtain. Further, a new and used automobile dealer having a distinct logo or trade name such as "CAR CITY" may not be located where an exchange number is available which has the digits "2 2 7" so that the logo or name can be alphabetically secured as an assigned subscriber number 227-2489.

The basic alignment of the ten numerical digits (with associated letters of the alphabet) for typical and modern push button or TOUCH TONE telephones is presented below along with the additional star (*) and pound (#) symbol buttons of such phones.

| 1 |     | 2 | ABC  | 3 | DEF |
|---|-----|---|------|---|-----|
| 4 | GHI | 5 | JKL  | 6 | MNO |
| 7 | PRS | 8 | TUV  | 9 | WXY |
| * |     | 0 | Oper.| # |     |

The older rotary dial telephones have the same sequence of ten numerical digits (1–0) with the same associated groupings of alphabet letters. Rotary phones, however, do not have the star (*) or pound (#) symbols as dialing options.

A substantial problem exists with respect to the hunt for numbers that can provide identity significance, i.e., within each geographical area there are only a limited number of exchanges. For example, the State of Nevada has a population that dictates that the entire state be assigned only a single NPA area code number, i.e., 702. Within the Las Vegas, Nev. area (including the immediate surrounding localities) there are approximately 95 telephone exchanges. In Las Vegas the so-called "Strip Area" is internationally famous for its hotel and casino establishments. Among this area's better known hotels is Caesars Palace Hotel and Casino. It is most probable that such establishment would like to have assigned to it the basic telephone number (within the 702 area) 223-7277 since such number could be dialed via alphabetical letter designation by the well recognized word "CAESARS." Although the subscriber assigned (4 digit) number 7277 for the 8 exchanges in the geographical area within which Caesars Palace is situated might be available or acquired by the hotel organization, there is no exchange within such geographical area (or within the general Las Vegas area) that has the 3 digit exchange number 223. Thus, under present telephone number assignment constraints, Caesars Palace Hotel and Casino is precluded from obtaining a phone number within the 702 number plan area that can be dialed by the trade name "CAESARS." Further, Caesars Palace may not be able to obtain an "800" national reserved dialing number that can include, as the last seven digits, the numerical sequence 223-7277 which spells out CAESARS.

It is a general object of the present invention to provide a telephone dialing and switching system for converting a customer selected or created telephone number, expressed as a trade name or unique and distinctive combination of alphabet letters and numbers having personal or business significance, to another telephone number (assigned to the customer by a local telephone company) which has little or no personal or business significance.

It is another object of the present invention to provide telephone dialing and switching means for converting a customer selected and specified sequence of alphabet letters and/or numbers of one or more letter and/or digit length which has personal or business significance to the customer (as dialed by a third party), to a second telephone number having a standard number of digits with little or no personal or business significance.

It is a further object of the invention to provide an alternative parallel telephone dialing and switching system (for installation in central telephone office facilities) through which a telephone service subscriber's personally selected and specified distinctive trade identity name or letter/number combination (of one or more letter and/or digit length) is converted into a second telephone number (assigned by the central telephone office) having a standard number of digits with little or no personal or business significance.

It is yet another object of the present invention to provide a means for translating and converting a telephone subscriber-created telephone dialing number, having personal or business significance to the subscriber, into a second telephone number (assigned by the central telephone office) having a standard number of digits without the need to reprogram the central office switching circuitry and without significantly increasing the average time required to connect a dialer of the subscriber-created number to the subscriber of such number.

These and other objects and advantages of the present invention will become apparent from the following summary and detailed description of the invention together with the accompanying drawing figure.

SUMMARY OF THE INVENTION

The present invention comprises a "special feature telephone dialing and switching application system" ("SFAS") and circuitry. The circuitry is designed to translate a customer selected or created telephone number (expressed as a trade name or unique and distinctive combination of alphabet letters and/or digits having personal or business significance and referred to as the "subscriber-created number"), and to convert such number to a second telephone number having a standard selection of digits, referred to as the "translated number" or the number assigned to the customer by the central office of the telephone company serving the customer area.

The subscriber-created number is comprised of a first sequence of 3 digits ("the switch sequence") followed by a second sequence of digits referred to as "the recognition sequence." The switch sequence of digits consists of an exchange number that is unique within the area code and perhaps within the entire network of area codes, i.e., a nation wide reserved exchange number similar to the "411" and "911" reserved numbers. The recognition sequence of digits consists of one or more digits (expressed as a distinct combination of alphabet letters and/or numbers) which have personal or business significance to the subscriber, followed by the pound (#) symbol.

Assuming that a telephone service company had, throughout the areas of its service, an assignable special exchange number (switch sequence number) such as "511," a new and used automobile dealer telephone subscriber (having an assigned phone number such as [702] 367-1796) might create (and reserve) the recognition sequence "CAR CITY #" (2272489#) within the telephone company's SFAS. In accordance with the present invention, a caller desiring to phone CAR CITY from within the [702] service area of the telephone company would dial "511-CAR CITY #" and the originating central office, through its standard switching matrix, would analyze the dialed number as "511-2272489 #". A caller desiring to phone CAR CITY from outside of the [702] area would dial "1-702-511-CAR CITY # and the originating central office (in any area) would analyze the dialed number as "1-702-511-2272489 #", the initial digit "1" indicating that the number called is outside of the area from which the call is being originated.

The sequence of telephone number switching, analysis and transmission events (handled by a call originating central office, ["OCO"], the call terminating central office ["TCO"], and the "special feature telephone dialing and switching application system" or "SFAS" of the invention) required to complete a call from an originating caller, via a "subscriber-created number", to the subscriber owning the created number in the same number phone area, is set forth hereinafter:

a) The originating caller removes his or her telephone from its hook or cradled position and the OCO gives the caller a dial tone and connects the caller's phone to a digit receiver.

b) The originating caller dials the "subscriber-created number", i.e., "511-CAR CITY #". The sequence of numerical digits 5-1-1-2-2-7-2-4-8-9 and # are stored in a "scratch pad register" associated with the digit receiver of the OCO. During the dialing sequence at the conclusion of the third digit (after the second "1" of the "511" sequence) the number sequence is stored in the scratch pad register and the central processing unit ("CPU") of the OCO switch begins to process the call.

c) There is stored in the OCO's number translation library the following information:

i. The fact that the initial "511" number sequence comprises an access code to a special feature table.

ii. The routing to connect the caller's line to the circuitry that provides access to the special feature table.

iii. The protocol required to transmit the numerical call information presently stored in the scratch pad register.

iv. Miscellaneous checking information to determine whether or not all required data is present.

d) The CPU locates a path through the OCO switching matrix from a digit transmitter to the special feature access circuitry leading to the SFAS of the invention.

e) The digits 2-2-7-2-4-8-9-#, stored in the OCO's scratch pad register, are loaded into the digit transmitter and transmitted to the SFAS.

f) At the conclusion of transmission of the "#" symbol digit the transmitter circuitry is cut off and a direct path of circuitry is established from the caller's line through the OCO's switching matrix to the special feature access circuit (an outgoing trunk of the OCO) and thence via a wired path (transmission line) to an incoming port of the SFAS.

g) The transmitted digits (including the # symbol digit) entering the SFAS, via its incoming port, enter the system's switching matrix and are transmitted to the digit receiver of the system.

h) A scratch pad register associated with the digit receiver of the SFAS stores the incoming numerical data (2-2-7-2-4-8-9-#).

i) The central processing unit ("CPU") of the SFAS retrieves the numerical data from the scratch pad register along with the count or number of digits that were input (including the # symbol) and places it in its "match register." The # symbol digit provides the system with indication that all expected data has been received.

j) The CPU of the SFAS uses the data residing in its match register (the numerical sequence 2-2-7-2-4-8-9) as an index into the system's translation library data table. The system begins its search by calling up the table of translations applicable to all 7 digit inputs. Each digit is analyzed, one at a time, in the order that they were input until the # symbol is reached. The first digit (the numeral 2) is analyzed by first looking at the translation table of 7 digit input. The answer to a digit analysis step is either the final translated number when the only digit left to analyze is the # symbol or the content of the next transation table applicable which in the case of the numerical sequence 2-2-7-2-4-8-9-# is also the numeral 2. The CPU, as it processes this information keeps track of what digits have been input, in what order the digits were input, and how many digits were input. When the system locates the last table of translation, i.e. the seventh digit which is the numeral 9, it finds A) the final output data which is the translated number 367-1796 (the subscriber's assigned number) and its equivalence B) the subscriber-created number 227-2489 (spelling out CAR-CITY) residing in the "match register." The system makes one last check to determine whether the data residing in the "match register" is the exact equivalent of the data contained in the "match data register", i.e., that the number sequence 227-2489 is equal to the number sequence 227-2489. If the the answer is yes the data contained in the final output data register (the telephone number assigned to the subscriber, i.e., the automobile dealer) is then located.

k) The information or data 3-6-7-1-7-9-6 (assigned number) stored at the numerical address 2-2-7-2-4-8-9 ("CAR CITY") is loaded into a scratch pad register of the CPU of the SFAS.

l) The CPU of the SFAS locates a free digit transmitter of the switching matrix of the special feature application system and connects it through the matrix to an outgoing port of the system. The outgoing port circuit of the SFAS is connected, via a transmission line channel to an incoming port circuit (incoming trunk) located on the OCO's switching matrix.

m) The CPU of the SFAS loads the numerical data 3-6-7-1-7-9-6 into the digit transmitter of the SFAS.

n) The digit transmitter sends the numerical data 3-6-7-1-7-9-6, via the SFAS's switching matrix and an outgoing port, to an incoming trunk of the OCO switching matrix.

o) The incoming trunk circuit of the OCO is connected via the switching matrix of the OCO to a digit receiver.

p) The scratch pad register, associated with the digit receiver at the OCO, is loaded with the incoming numerical data 3-6-7-1-7-9-6. The CPU of the OCO utilizes the 3-6-7 portion of the data word as an index into the translation library to determine where within the calling area (702) the telephone number 367-1796 resides.

q) Utilizing the data stored at the address 3-6-7 the CPU locates an available outgoing trunk circuit that is connected to the terminating central telephone office ("TCO") located in the area (702) where the exchange series 3-6-7 (switch sequence of the assigned number) is assigned.

r) The CPU establishes a path through the switching matrix at the OCO from the digit transmitter to an outgoing trunk and reserves a path through the switching matrix from the incoming trunk through the switching matrix of the OCO to the outgoing trunk.

s) The CPU also loads the numerical data residing in the scratch pad register into the digit transmitter which transmits the numerical data via a transmission line to the switch and incoming trunk of the TCO that serves the subscriber (creating the recognition sequence "CAR CITY #") that has the assigned number 367-1796 serviced by the TCO.

t) The TCO switch upon receiving the transmitted numerical data, and acting upon it, establishes a path from the incoming trunk, through its switching matrix to the line appearance of the line assigned to telephone number 367-1796.

u) The CPU of the OCO discards the established path through its switching matrix (established in "r" above) and establishes the path reserved through such matrix (reserved in "r" above).

v) At the TCO switch ringing (or another form of signal) is applied to the telephone line assigned for the telephone number 367-1796.

w) Upon answering the telephone at assigned number 367-1796 (dialed through the OCO by a caller dialing "CAR CITY #") a talking line exists from the line appearance of the OCO switch, through that switch's switching matrix, to the special feature application system (via a transmission line channel), through the switching matrix of such system and an outgoing port thereof, through a transmission line to an incoming trunk of the OCO's switch, through the OCO's switching matrix to an outgoing trunk of the OCO, through a transmission line to an incoming trunk of the TCO switch, through the incoming trunk, and through the switching matrix to the line appearance of assigned telephone number 367-1796.

BRIEF DESCRIPTION OF THE DRAWING FIGURE

The drawing FIGURE comprises a block diagram illustrating the essential components of: a call originating central telephone office (OCO); a call terminating central telephone office (TCO); and the special feature telephone dialing and switching application system of the present invention, together with the interconnecting telephone transmission lines, for converting a subscriber-created telephone number (expressed as a distinctive reserved trade name or other combination of letters and/or numbers having personal or business significance) to another telephone number (assigned to the subscriber by a local telephone company) which has little or no personal or business significance.

DETAILED DESCRIPTION OF THE INVENTION

The present invention may be most easily understood by reference to the interconnected and interacting telephone system circuitry and components forming the essential parts of modern telephone central offices and the components of the special feature telephone dialing and switching application system (or alternative parallel telephone dialing and switching system) of the invention as presented in the block diagram of the accompanying drawing sheet. The principal sections of the system of the invention are: the call originating central telephone company office (originating central office "OCO") 10; the call terminating central telephone company office (terminating central office "TCO") 50; and special feature telephone dialing and switching application system (special feature application system "SFAS") 80. The OCO 10 and TCO 50 of the system are conventional in electronic component structure, interconnection and function. The SFAS section of the overall system is located at the OCO or other centralized location.

The OCO 10 includes as principal conventional components: a switching matrix 12; a CPU 14; a digit receiver 16; scratch pad register 18; digit transmitter 20; a multiplicity of outgoing trunks represented by outgoing trunk 22; a multiplicity of incoming trunks represented by incoming trunk 24; intra-office trunks represented by intra-office trunk 26; miscellaneous trunks represented by miscellaneous trunk 28; and miscellaneous circuits 30. The CPU 14, digit receiver 16, digit transmitter 20, outgoing trunk 22, incoming trunk 24, intra-office trunk 26, miscellaneous trunk 28 and miscellaneous circuits 30 are all electrically interconnected to switching matrix 12 through their respective circuit lines 14a, 16a, 20a, 22a, 24a, 26a, 28a and 30a. The scratch pad register 18, associated with the digit receiver 16, is interconnected to the digit receiver via circuit line 16b and to the digit transmitter 20 via circuit line 18a. The digit receiver 16 is connected to the incoming trunk 24 by the establishment of a path (dashed line) Px. The digit transmitter 20 is connected to the outgoing trunk 22 by the establishment of a path (dashed line) Py. Outgoing trunk 22 is also connected to the incoming trunk 24 by path P5. A multiplicity of customer and subscriber telephone stations are represented by telephones 32, 34 and 36 each interconnected to the switching matrix 12 of OCO 10 via customer lines 32a, 34a and 36a and switches 32b, 34b and 36b, respectively. For purposes of describing the invention the telephone 32 has been designated on the block diagram of the system as the telephone of the originating caller of a subscriber-created number.

The CPU 14 is interconnected to a program library 38 via circuit line 38a and the CPU is interconnected to a translation library 40 via a circuit line 40a. To accommodate the SFAS 80 of the present invention, the OCO 10 is provided with special access circuits 42 interconnected to the switching matrix 12 through circuit line 42a. The translation library 40, associated with the CPU 14, is also provided with a special feature table 44. The features and function of the special feature table 44 will be explained hereinafter.

The TCO 50 (call terminating central office) includes as principal conventional components: a switching matrix 52; a multiplicity of incoming trunks represented by incoming trunk 54; a multiplicity of outgoing trunks represented by outgoing trunk 56; intra-office trunks represented by intra-office trunk 58; miscellaneous circuits 60 and special access circuits 62. Although not shown, the TCO 50 also has the conventional CPU unit with associated program library and translation library. The incoming trunk 54, outgoing trunk 56, intra-office trunk 58, miscellaneous circuits 60 and special access circuits 62 are all electrically interconnected to switching matrix 52 through their respective circuit lines 54a, 56a, 58a, 60a and 62a. A multiplicity of customer and subscriber telephone stations are represented by telephones 64, 66 and 68 each interconnected to the switching matrix 52 of TCO 50 via customer lines 64a, 66a and 68a and switches 64b, 66b and 68b, respectively. For purposes of describing the invention the telephone 64 has been designated on the block diagram of the system as the telephone of the name subscriber-created number.

The SFAS 80 of the invention comprises a separate and unique selection and arrangement of electronic components and circuitry located at the OCO 10 or other centralized location. The SFAS 80 includes as principal components: a switching matrix 82; a CPU 84; a digit receiver 86; scratch pad register 88; a digit transmitter 90; a multiplicity of incoming ports represented by incoming ports 92 and 94; a multiplicity of outgoing ports represented by outgoing ports 96 and 98; and miscellaneous circuits 100.

The CPU 84, digit receiver 86, digit transmitter 90 and miscellaneous circuits 100 are all electrically interconnected to switching matrix 82 through their respective circuit lines 84a, 86a, 90a and 100a. Also, the incoming ports 92 and 94 and outgoing ports 96 and 98 are electrically interconnected to the switching matrix 82 through their respective circuit lines 92a, 94a, 96a and 98a. For purposes of describing the operation of the invention only incoming port 92 and outgoing port 96 of the SFAS 80 will be included in the operational description.

The SFAS 80 of the invention is located proximate to and is interconnected to the call originating central office (OCO) 10 through conventional multi-channel transmission lines TL1 and TL2. Transmission line TL1 connects the incoming port 92 of SFAS 80 at terminal 92b to the special access circuit 42 of OCO 10 at terminal 42b. Transmission line TL2 connects the outgoing port 96 of SFAS 80 at terminal 96b to incoming trunk 24 of OCO 10 at terminal 24b. A conventional multi-channel transmission line TL3 connects the outgoing trunk 22 of originating central office 10 at terminal 22b to the incoming trunk 54 of terminating central office 50 at terminal 54b.

The CPU 84 of the SFAS 80 is interconnected to a program library 102 via circuit line 102a and CPU 84 is interconnected to a translation library 104 via a circuit line 104a. The translation library 104, associated with the CPU 84, is also provided with a special feature table 106. The features and functions of the special feature table 106 will be explained hereinafter.

EXAMPLE OF SYSTEM OPERATION

The operation of the SFAS of the present invention may be better appreciated through reference to the exemplary subscriber-created number "CAR CITY #" as applied to the system embodiment (shown in the drawing block diagram) as interconnected to an OCO within the 702 number plan area.

Assume that a Nevada telephone service company has, throughout the Nevada number plan service area 702, the assignable special exchange number (switch sequence number) "511". Assume further that a new and used automobile dealer telephone subscriber within the 702 area (having the assigned phone number 367-1796) creates (and reserves) the alphabetical trade name recognition sequence "CAR CITY #" (numerical recognition sequence 2272489#). Thus, in accordance with the present invention, the numerical recognition sequence 2272489# is entered into the special feature table of the number translation library of the CPU of the service company's central offices and into the special feature table of the number translation library of the CPU of the SFAS of the invention. A caller desiring to phone CAR CITY from within the 702 area would dial "511-CAR CITY #" and the OCO, through its standard switching matrix, would read the dialed number as "511-2272489 #". A caller desiring to phone CAR CITY from outside of the 702 area would dial "1-702-511-CAR CITY #" and the originating central office (in any area) would read the dialed number as "1-702-511- 2272489 #". In either case the switch sequence number 511 would signify that the dialed number is a special feature reserved number and direct the number throughout the system in accordance with the invention.

Operation of SFAS of the invention begins when an originating caller (for example at a telephone station 32) removes the telephone receiver-transmitter unit of the telephone from its hook or cradled position thereby connecting the telephone via line 32a to the switching matrix 12 (at switch 32b) of the OCO 10 which services telephone station 32. The CPU 14 of the central office 10 gives the caller a dial tone and locates a free path P1 within the switching matrix 12 whereby the caller's phone is connected to a digit receiver (designated as digit receiver 16) through its matrix connect line 16a. The originating caller (desiring to reach CAR CITY) dials the subscriber-created and reserved number "511-CAR CITY #" (the numerical sequence 511-2272489#). The numerical sequence of digits are stored in the scratch pad register 18 associated with digit receiver 16 and connected thereto via line 16b. The scratch pad register in turn is interconnected to a digit transmitter 20 via line 18a. During the dialing sequence, at the conclusion of the third digit (after the second "1" of the "511" sequence), the CPU 14 of OCO 10 begins to process the call.

There is stored in the OCO's number translation library 40 (interconnected to CPU 14 via line 40a) the following information:

i. The fact that the initial "511" number sequence comprises an access code to a special feature table 44 which is a part of the translation library.

ii. The routing to connect the caller's line 32a to the circuitry that provides access to the special feature table.

iii. The protocol required to transmit the numerical call information presently stored in the scratch pad register 18.

iv. Miscellaneous checking information to determine whether or not all required data is present.

The CPU 14 locates a path P2 through the switching matrix 12 from the digit transmitter 20 (interconnected to the matrix 12 via line 20a) to special feature access circuitry 42 (interconnected to the switching matrix 12 via line 42a) which is interconnected via transmission line TL1 to the SFAS 80 of the invention.

The digits 2-2-7-2-4-8-9-#, stored in the OCO's scratch pad register 18, are loaded into the digit transmitter 20 and transmitted to the SFAS. At the conclusion of the transmission of the "#" symbol digit the 20 transmitter circuitry is cut off and a direct path of circuitry (not illustrated in the block diagram) is established from the caller's line 32a through the switching matrix 12 to the special feature access circuit 42 (an outgoing trunk of the OCO) and thence, via transmission line TL1, to an incoming port 92 of the SFAS 80. The transmitted numerical digits (including the # symbol digit) entering the SFAS, via its incoming port 92, enter the system's switching matrix 82 and are transmitted to the digit receiver 86 of the system via a matrix path P3 established by the CPU 84 of the system.

A scratch pad register 88 associated with digit receiver 86 of the SFAS 80 (interconnected to the digit receiver via line 86b) stores the incoming numerical data (2-2-7-2-4-8-9-#). CPU 84 retrieves the numerical data from the scratch pad register 88 and places it in its match register. The # symbol digit provides the system with indication that all expected data has been received. The CPU 84 of the SFAS 80 uses the data residing in its match register (the numerical sequence 2-2-7-2-4-8-9) as an index into the system's translation library data table 106 (special feature table) and retrieves the information stored at that address in the table (the numerical address 2272489). The information stored at address 2272489 is the telephone number assigned to the automobile dealer telephone subscriber creating the special name number "CAR CITY #". i.e., the number (702) 367-1796 mentioned above.

The information or data 3-6-7-1-7-9-6 stored at the numerical address 2-2-7-2-4-8-9 ("CAR CITY") is loaded into an output register of the CPU 84. CPU 84 locates a free digit transmitter 90 (interconnected to scratch pad register 88 via line 88a) of the switching matrix 82 of SFAS 80 and connects it through the matrix 82 (via matrix path P4) to an outgoing port 96 of the system. The outgoing port 96 is interconnected to the switching matrix 82 via line 96a and such port is connected, via a channel of transmission line TL2 to an incoming port circuit (incoming trunk 24) located on the switching matrix 12 of OCO 10.

The numerical data 3-6-7-1-7-9-6 (received by incoming trunk 24) is directed through the switching matrix 12 of OCO 10 via a temporary path Px to digit receiver 16. The scratch pad register 18 associated with digit receiver 16 is loaded with the incoming numerical data 3-6-7-1-7-9-6. The CPU 14 of OCO 10 utilizes the 3-6-7 portion of the data as an index to the translation library 40 to determine where within the calling area (702) the telephone number 367-1796 resides. Utilizing the data stored at address 3-6-7 the CPU 14 locates an available outgoing trunk circuit 22 that is connected to the TCO 50 located in the (702) area where the exchange series 3-6-7 (switch sequence of the assigned number) is assigned. From the available outgoing trunk 22 the CPU 14 establishes a path P5 connecting the switching matrix 12 to the incoming trunk 24 which is interconnected to the SFAS 80 via transmission line TL3. An available temporary path Py within the switching matrix 12 is also set up connecting the digit transmitter 20 of the OCO 10 to the outgoing trunk 22. The digits 3-6-7-1-7-9-6 are then sent from the scratch pad register 18 to digit transmitter 20 and through the switching matrix 12 and to outgoing trunk 22. At that time the temporary paths Px and Py are discarded and connection is then maintained through path P5 and the selected channel of transmission line TL3 to the switch and incoming trunk 54 of TCO 50 that serves the subscriber (creating the recognition sequence "CAR CITY #") that has the assigned number 367-1796 serviced by TCO 50.

The TCO switch upon receiving the transmitted numerical data, and acting upon it, establishes a path P6 from the incoming trunk 54 (connected to the switching matrix 52 of TCO 50 via line 54a), through its switching matrix to the line appearance of the line 64b assigned to telephone number 367-1796 at telephone station 64. At the TCO switch 64b ringing is applied to the telephone line 64a assigned for the phone station at 367-1796. Upon answering the telephone at assigned number 367-1796 (dialed through the OCO 10 by a caller at phone station 32 dialing "CAR CITY #") a talking line is established from the appearance of the OCO switch 32b, through that switch's switching matrix (12), to the SFAS 80 (via a channel of transmission line TL1, through the switching matrix 82 of SFAS 80 and to an outgoing port 96 thereof, via a channel of transmission line TL2 to incoming trunk 24 of the OCO switch, through the switching matrix 12 of OCO 10 (via path P5) to an outgoing trunk 22 thereof, via a channel of transmission line TL3 to an incoming trunk 54 of the TCO (50) switch, through the incoming trunk 54 of TCO 50, and through the switching matrix 52 of TCO 50 to the line appearance 64a of the assigned telephone number 367-1796 at telephone station 64.

It will be recalled that it is an object of the present invention to provide a telephone dialing and switching system for converting a customer selected and specified sequence of alphabet letters and/or numbers of one or more letter and/or digit length which has personal or business significance to the customer (as dialed by a third party) to a second (assigned) telephone number having a standard number of digits with little or no personal or business significance. It will also be recalled that the CPU 84 of the SFAS 80 of the invention uses the data placed in its matched register (a single number or a sequence of numbers which have a respective name or letter significance) as an index into the system's translation library data table. The system (as previously discussed) calls up the tables of translation applicable to the digits of input up to the # symbol as dialed. To illustrate the type of translator tables utilized to match a dialed name or letter sequence with an assigned telephone number, a simple example is presented hereinafter based upon the assumption that the nationally recognized company "American Express" might desire to provide its card member-subscribers with an easily remembered telephone number "AEX" instead of its national phone number for card member services, i.e., (800) 528-4800. Thus, American Express would, in accordance with the SFAS system of the invention, purchase for each number phone area code the symbol number "AEX #". Within the SFAS system's translation library, and the special feature tables thereof, the AEX # number would be assigned to three translator tables as Illustrated in the following Data Chart I.

DATA CHART 1

Translator Table 1

| Address Location | Digit Dialed | Data |
|---|---|---|
| +1 | 1 | Address of Next Table |
| +2 | 2 | A/N/T |
| +3 | 3 | A/N/T |
| +4 | 4 | A/N/T |
| +5 | 5 | A/N/T |
| +6 | 6 | A/N/T |
| +7 | 7 | A/N/T |
| +8 | 8 | A/N/T |
| +9 | 9 | A/N/T |
| +10 | 0 | A/N/T |
| +11 | * | A/N/T |
| +12 | # | Error Stop |

(Same as Below / Same as Above)

Translator Table 2

| Address Location | Digit Dialed | Data |
|---|---|---|
| +1 | 1 | Address of Next Table |
| +2 | 2 | A/N/T |
| +3 | 3 | A/N/T |
| +4 | 4 | A/N/T |
| +5 | 5 | A/N/T |
| +6 | 6 | A/N/T |
| +7 | 7 | A/N/T |
| +8 | 8 | A/N/T |
| +9 | 9 | A/N/T |
| +10 | 0 | A/N/T |
| +11 | * | A/N/T |
| +12 | # | Error Stop |

(Same as Below / Same as Above)

Final Translator Table 3

| Address Location | Digit Dialed | Final Data | Match Data Input Digits |
|---|---|---|---|
| +1 | 1 | | |
| +2 | 2 | | |
| +3 | 3 | | |
| +4 | 4 | | |
| +5 | 5 | | |
| +6 | 6 | | |
| +7 | 7 | | |
| +8 | 8 | | |
| +9 | 9 | (800) 528-4800 | AEX # |
| +10 | 0 | | |
| +11 | * | | |
| +12 | # | Error Stop | |

Checks with Match Register Digits AEX #

Data Chart I shows that for the dialed number AEX # to reach the American Express phone number (800) 528-4800 the 3 digit input 2-3-9 # (corresponding to the telephone dial letters A-E-X) is put into a "match register" of the CPU 84 of SFAS 80 and counted for the three digits plus the # symbol of inputs.

The CPU 84 identifies the 3 digits of input plus the # symbol which closes the letter dialing transaction. The system takes into account the fact that there are three digits of input and locates the address (the "letter address" where in the CPU the data resides which needs to be sorted through) of the first translator table of the 3 digit translator data bank of Data Chart I. The CPU 84 of the SFAS uses the data residing in its "match register" (AEX #) as an index into the systems translation library special feature data table. The system begins its search by calling up the 3 digit translator (a cluster of 3 tables) in the memory of the CPU (Data Chart I). Note that within the CPU memory there will be a series of digit input translators commencing with a 1 digit input translator and ending with a 7 (or more) digit input translator. It will be noted that the 3 digit translator of the Data Chart I is made up of 3 translator tables through which the CPU locates the true phone number (assigned number) (800) 528-4800 of American Express.

The CPU, upon its recognition that for the dialed AEX # phone number it needs to search the 3 digit translator library of data, scans the first translator table for the address of the second translator table. The CPU finds such address at the address location +2 for the dialed digit 2 (the letter A on the telephone keypad). The search is then continued on to the second translator table, the table that contains all possible inputs of the second dialed digit, and which contains the address for the third translator table. The CPU finds such address for the third translator table. The CPU finds such address at the address location +3 for the dialed digit 3 (the letter E on the telephone keypad). The search is concluded with the final translator table, the table that contains all possible inputs in the 3rd position of the 3 digit number as dialed (transaction closed by the # symbol). In the final table, instead of reaching the address of a further table at the +9 location for the dialed digit 9 (the letter X on the telephone keypad), the CPU finds the translated true number (800) 528-4800. The SFAS 80 of the invention thereupon concludes that the dialed number AEX # is the equivalent of the assigned number (800) 528-4800 and sends such number via the system's digit transmitter 90 through the switching matrix 82 and outgoing port 96 back to the OCO 10 for completion of the call.

Referring back to the original example of a subscriber-created number, i.e., "CAR CITY #" (represented numerically as 2272489#), it is to be noted that such number requires a 7 digit translator data bank with 7 translator tables. The following Data Chart II illustrates tables 1, 2 and 7 of such translator.

DATA CHART II

| Address Location | Translator Table 1 Digit Dialed | Data |
|---|---|---|
| +1 | 1 | Address of Next Table |
| +2 | 2 | A/N/T |
| +3 | 3 | A/N/T |
| +4 | 4 | A/N/T |
| +5 | 5 | A/N/T |
| +6 | 6 | A/N/T |
| +7 | 7 | A/N/T |
| +8 | 8 | A/N/T |
| +9 | 9 | A/N/T |
| +10 | 0 | A/N/T |
| +11 | * | A/N/T |
| +12 | # | Error Stop |

| Address Location | Translator Table 2 Digit Dialed | Data |
|---|---|---|
| +1 | 1 | Address of Next Table |
| +2 | 2 | A/N/T |
| +3 | 3 | A/N/T |
| +4 | 4 | A/N/T |
| +5 | 5 | A/N/T |
| +6 | 6 | A/N/T |
| +7 | 7 | A/N/T |
| +8 | 8 | A/N/T |
| +9 | 9 | A/N/T |
| +10 | 0 | A/N/T |
| +11 | * | A/N/T |
| +12 | # | Error Stop |

3-6

| Address Location | Final Translator Table 7 Digit Dialed | Final Data | Match Data Input Digits |
|---|---|---|---|
| +1 | 1 | | |
| +2 | 2 | | |
| +3 | 3 | | |
| +4 | 4 | | |
| +5 | 5 | | |
| +6 | 6 | | |
| +7 | 7 | | |
| +8 | 8 | | |
| +9 | 9 | 367-1796 | 227-2489 # |
| +10 | 0 | | |
| +11 | * | | |
| +12 | # | Error Stop | |

Checks with Match Register Digits 227-2489 #

Through the application of the SFAS of the present invention to conventional modern telephone central office circuitry (including digital key telephones) it is possible to convert a customer designed and selected sequence of alphabet letters and/or numbers of one or more letter and/or digit length (followed by the # symbol digit) as dialed by a third party, to a second assigned telephone number having a standard number of 7 digits (including 3 digit exchange sequences and 4 digit recognition sequences). The customer designed or subscriber-created name or logo number (which has personal or business significance) includes a special initial switch sequence or exchange sequence number (3 digits) which is universal to an entire number phone area code and which yields dialing entry to special access circuits and a special feature table of numbers that are reserved within the SFAS circuitry system.

It is contemplated that the subscriber who has created a name number of personal or business significance will have to pay a fee to the telephone operating company providing service within a number plan area for reservation of the name number associated with the special exchange sequence number utilized for reserved name numbers within the area. In accordance with the present invention the length of the name number (number of alphabet letters) is not limited to the normal 4 digit recognition sequence. Thus, the recognition sequence of digits (dialed as alphabet letters) is only limited by the practicality of the personal or business name that the phone subscriber wishes to develop to a point of commercial or personal recognition and significance.

A number of examples of commercially significant trade names are presented hereinafter to demonstrate the value of the name number telephone dialing system of the invention. Again, the 702 number plan area (Nevada) is used in the examples along with 511 as the special area-wide exchange sequence number.

Automobile Rental Companies within the Nevada 702 area:
  Dial "511 HERTZ #" to reach a predetermined Hertz office;
  Dial "511 AVIS #" to reach a predetermined Avis office; and
  Dial "511 BUDGET #" to reach a predetermined Budget office.

Fast Food Restaurants within the Nevada 702 area:
  Dial "511 BURGER KING #" to reach a predetermined Burger King restaurant;
  Dial "511 ARBYS #" to reach a predetermined Arby's restaurant; and
  Dial "511 MCDONALDS #" to reach a predetermined McDonald's restaurant.

It is to be noted that where a business is local in scope of activities and customer base it may be that an area-wide exchange number sequence is not merited for association with a reserved name number. It should also be noted that where the subscriber of a subscriber-created telephone number is located within the national phone area and within the local area having like regular exchange or switch sequence numbers as a caller of the subscriber-created number, the call terminating central office may also be the call originating central office. It is also important to recognize that the special feature application system of the invention permits the use and linking of more than one subscriber-created telephone number with respect to a single assigned telephone number and that the system further permits a single subscriber-created telephone number to be linked to different assigned numbers as directed by the originating switch sequence of dialed digits.

The foregoing descriptions of embodiments of the invention have been presented for the purpose of illustration only. They are not intended to be exhaustive or to limit the invention to the precise forms disclosed. Many modifications and variations are possible in the light of the above teachings. It is intended that the scope of the invention be limited not by the foregoing detailed descriptions thereof, but rather by the claims appended hereto.

What is claimed is:

1. A special feature telephone dialing and switching application system for interconnection to and interaction with the switching system of a central telephone office for converting subscriber-created telephone numbers, including a recognition sequence of one or more digits having alternative alphabetical letter significance, to standard assigned telephone numbers including the area code and a 3 digit switch sequence number and a 4 digit recognition sequence number, the recognition sequence of digits of the subscriber-created telephone numbers being followed by the # symbol digit of key dialing telephones and preceded by a special switch sequence number assigned to said special feature application system within the number phone area code serviced by said central telephone office, said switching system of said central office including: a switching matrix with digit receiving means coupled to key dialing telephone circuits for receiving the digits of standard assigned telephone numbers and subscriber-created telephone numbers; a scratch pad register associated with the digit receiving means for temporarily storing telephone numbers; and a central telephone call processing unit for establishing number transmission paths within said switching matrix and including a number translation library with a special feature table accessed by the special switch sequence number assigned to the special feature telephone dialing and switching application system, and said switching matrix of said central office including: digit transmitting means interconnected to said scratch pad register; incoming trunk circuit means; and outgoing trunk circuit means including special access circuits, the digit transmitting means being interconnected to said special access circuits through number transmission paths within said switching matrix established by the central telephone call processing unit and based upon information derived from the special feature table of said processing unit whereby subscriber-created telephone numbers are transmitted to said special access circuits, said special feature application system comprising:

a) a special feature switching matrix including incoming circuit port means coupled to the special access circuits of the outgoing trunk circuit means of the switching matrix of the switching system of said central telephone office, and outgoing circuit port means coupled to the incoming trunk circuit means of the switching matrix of the switching system of said central telephone office;

b) digit receiver means forming a part of said special feature switching matrix and coupled therethrough by transmission paths to said incoming circuit port means;

c) a scratch pad register associated with the digit receiving means of the special feature switching matrix for temporarily storing the subscriber-created telephone number;

d) a special feature call processing unit for establishing number transmission paths within the special feature switching matrix and including a number translation library with a special feature table containing the assigned standard telephone numbers, including the area code and 3 digit switch sequence numbers with their respective 4 digit recognition sequence numbers, related to subscriber-created numbers; and e) digit transmitting means interconnected to the scratch pad register of said special feature switching matrix and interconnected to the outgoing circuit ports thereof through number transmission paths within said switching matrix established by the special feature call processing unit of said special feature application system, said special feature application system, as directed by the special feature call processing unit thereof, transmitting standard assigned telephone numbers, related to subscriber-created numbers, derived from the special feature table of said call processing unit through number transmission paths to the outgoing circuit ports of said special feature application system and thence to the incoming trunk circuit means of the switching matrix of the switching system of said central telephone office for processing in regular fashion as standard assigned telephone numbers.

2. The special feature telephone dialing and switching application system for converting subscriber-created telephone numbers to standard assigned telephone numbers as claimed in claim 1 wherein the special feature call processing unit of said special feature application system is a microprocessor.

3. The special feature telephone dialing and switching application system for converting subscriber-created telephone numbers to standard assigned telephone numbers as claimed in claim 1 wherein the special feature table of the translation library of the special feature call processing unit includes sets of digit input translator tables for locating the digits of standard assigned telephone numbers which match the input digits of subscriber-created telephone numbers.

4. The special feature telephone dialing and switching application system for converting subscriber-created telephone numbers to standard assigned telephone numbers as claimed in claim 3 wherein the sets of digit input translator tables each include a number of input translator tables equal to the number of digits in the subscriber-created telephone numbers up to the # symbol digit of said numbers.

5. The special feature telephone dialing and switching application system for converting subscriber-created telephone numbers to standard assigned telephone numbers as claimed in claim 4 wherein the input translator tables of each set of said tables are analyzed in sequence by the special feature call processing unit of said special feature application system to find the standard telephone numbers which match the subscriber-created telephone numbers.

6. The special feature telephone dialing and switching application system for converting subscriber-created telephone numbers to standard assigned telephone numbers as claimed in claim 1 wherein the number translation library of the central telephone call processing unit of said central telephone office includes means for recognizing the special switch sequence numbers assigned to and preceding subscriber-created numbers and for providing access of said subscriber-created numbers when dialed to the special feature table of said library.

7. A special feature telephone dialing and switching application system for interconnection to and interaction with the switching system of a central telephone office for converting subscriber-created telephone numbers to standard assigned telephone numbers including the area code, the switch sequence digits and recognition sequence digits, the recognition sequence digits of the subscriber-created telephone numbers being followed by the # symbol digit of key dialing telephones and being preceded by a special switch sequence number assigned to said special feature application system within the number phone area code serviced by said central telephone office, said switching system of said central office including: a switching matrix with digit receiving means coupled to key dialing telephone circuits for receiving the dialed digits of assigned telephone numbers and subscriber-created telephone numbers; a scratch pad register associated with the digit receiving means for temporarily storing telephone numbers; and a central telephone call processing unit for establishing number transmission paths within said switching matrix and including a number translation library with a special feature table accessed by the special switch sequence numbers assigned to the special feature telephone dialing and switching application system, and said switching matrix of said central office including: digit transmitting means interconnected to said scratch pad register; incoming trunk circuit means; and outgoing trunk circuit means including special access circuits, the digit transmitting means being interconnected to said special access circuits through number transmission paths within said switching matrix as established by said central call processing unit and based upon information derived from the special feature table of said processing unit whereby subscriber-created telephone numbers are transmitted to said special access circuits, said special feature application system comprising:

a) a special feature switching matrix including incoming circuit port means coupled to the special access circuits of the outgoing trunk circuit means of the switching matrix of the switching system of said central telephone office, and outgoing circuit port means coupled to the incoming trunk circuit means of the switching matrix of the switching system of said central telephone office;

b) digit receiving means coupled through said switching matrix to said incoming circuit port means;

c) a scratch pad register associated with the digit receiving means of said switching matrix for temporarily storing the digits of the subscriber-created telephone numbers;

d) a special feature call processing unit for establishing number transmission paths within said switching matrix and including a number translation library with a special feature table containing the recognition sequence digits of subscriber-created numbers matched to the area code, the switch sequence digits and the recognition sequence digits of assigned standard telephone numbers; and e) digit transmitting means interconnected to the scratch pad register of said switching matrix and interconnected to the outgoing circuit ports thereof through number transmission paths within said switching matrix established by said call processing unit of said special feature application system, said special feature application system, as directed by said call processing unit thereof, transmitting standard assigned telephone numbers, matched to subscriber-created numbers, derived from the special feature table of said call processing unit through number transmission paths to the outgoing circuit ports of said special feature application system and thence to the incoming trunk circuit means of the switching matrix of the switching system of said central telephone office for processing as standard assigned telephone numbers.

8. The special feature telephone dialing and switching application system for converting subscriber-created telephone numbers to standard assigned telephone numbers as claimed in claim 7 wherein the special feature call processing unit of said special feature application system includes means for setting up a match register wherein subscriber-created telephone numbers are retrieved from the scratch pad register of said system along with a count of the digits of said subscriber-created numbers including the # symbol digit.

9. The special feature telephone dialing and switching application system for converting subscriber-created telephone numbers to standard assigned telephone numbers as claimed in claim 8 wherein the special feature call processing unit of said special feature application system includes means for using the subscriber-created telephone number data residing in its match register as an index into said systems number translation library and the special feature table of the translation library of said call processing unit includes sets of digit input translator tables for locating the digits of standard assigned telephone numbers which match the input digits of subscriber-created telephone numbers.

10. The special feature telephone dialing and switching application system for converting subscriber-created telephone numbers to standard assigned telephone numbers as claimed in claim 9 wherein the sets of digit input translator tables each include a number of input translator tables equal to the number of digits in the subscriber-created telephone numbers up to the # symbol digit of said numbers.

11. The special feature telephone dialing and switching application system for converting subscriber-created telephone numbers to standard assigned telephone numbers as claimed in claim 10 wherein the input translator tables of each set of said tables are analyzed in sequence by the special feature call processing unit of said special feature application system to find the standard telephone numbers which match the subscriber-created telephone numbers.

12. The special feature telephone dialing and switching application system for converting subscriber-created telephone numbers to standard assigned telephone numbers as claimed in claim 7 wherein the number translation library of the central telephone call processing unit of said central telephone office includes means for recognizing the special switch sequence numbers assigned to and preceding subscriber-created numbers and for providing access of said subscriber-created numbers when dialed to the special feature table of said library.

13. The special feature telephone dialing and switching application system for converting subscriber-created telephone numbers to standard assigned telephone numbers as claimed in claim 7 wherein said special feature application system includes means for linking more than one subscriber-created telephone number to a single assigned telephone number.

14. The special feature telephone dialing and switching application system for converting subscriber-created telephone numbers to standard assigned telephone numbers as claimed in claim 7 wherein said special feature application system includes means for linking a single subscriber-created telephone number to more than one assigned telephone number.

* * * * *